United States Patent [19]

Rogers et al.

[11] Patent Number: 4,954,839

[45] Date of Patent: Sep. 4, 1990

[54] SELF-ALIGNING PRINT HEAD ASSEMBLY WITH ADVANCED SHIELDING CHARACTERISTICS

[75] Inventors: Steven A. Rogers, Leesburg; George Bockelmann, Vienna; Gary Hester, Sterling, all of Va.

[73] Assignee: Cryptek, Inc., Herndon, Va.

[21] Appl. No.: 383,436

[22] Filed: Jul. 24, 1989

[51] Int. Cl.[5] ........................ G01D 15/10; H05B 1/00; B41J 3/02

[52] U.S. Cl. ................................ 346/76 PH; 219/216; 400/120

[58] Field of Search ............ 219/216 PH; 346/76 PH; 400/120

[56] References Cited

U.S. PATENT DOCUMENTS

| | | | |
|---|---|---|---|
| 4,184,063 | 1/1980 | Heiling et al. | 219/216 |
| 4,361,844 | 11/1982 | Nozaki et al. | 346/76 PH |
| 4,369,452 | 1/1983 | Anno et al. | 346/76 PH |
| 4,588,997 | 5/1986 | Tuan et al. | 346/76 PH |
| 4,626,871 | 12/1986 | Schuessler | 346/76 PH |
| 4,651,164 | 3/1987 | Abe et al. | 346/76 PH |
| 4,712,930 | 12/1987 | Maruno et al. | 346/76 PH |

FOREIGN PATENT DOCUMENTS

| | | |
|---|---|---|
| 0115872 | 8/1984 | European Pat. Off. . |
| 60-18359 | 1/1985 | Japan . |

*Primary Examiner*—Bruce A. Reynolds
*Assistant Examiner*—Huan Tran
*Attorney, Agent, or Firm*—Cushman, Darby & Cushman

[57] ABSTRACT

A shielded print head assembly has a plurality of pieces that are self-aligned with one another. A base forms a ground plane, and includes a registry structure thereon which is preferably a pin extending above a top surface thereof. A circuit board is aligned by connecting inner surfaces of the circuit board around the pin to precisely locate a connector of the circuit board. A print head is located adjacent to the circuit board such that its connector is exactly adjacent to connector of the circuit board. An innerface connector is then used to connect between the circuit board connector and the print head connector, the interface connector being completely shielded by a cover. The interface connector is also held in self-alignment by the registry structure. The interface connector also has a top surface defining an insulation area, coupled against the cover which forms a ground plane. In this way, a shielded and self-aligned multi-piece print head is formed.

27 Claims, 3 Drawing Sheets

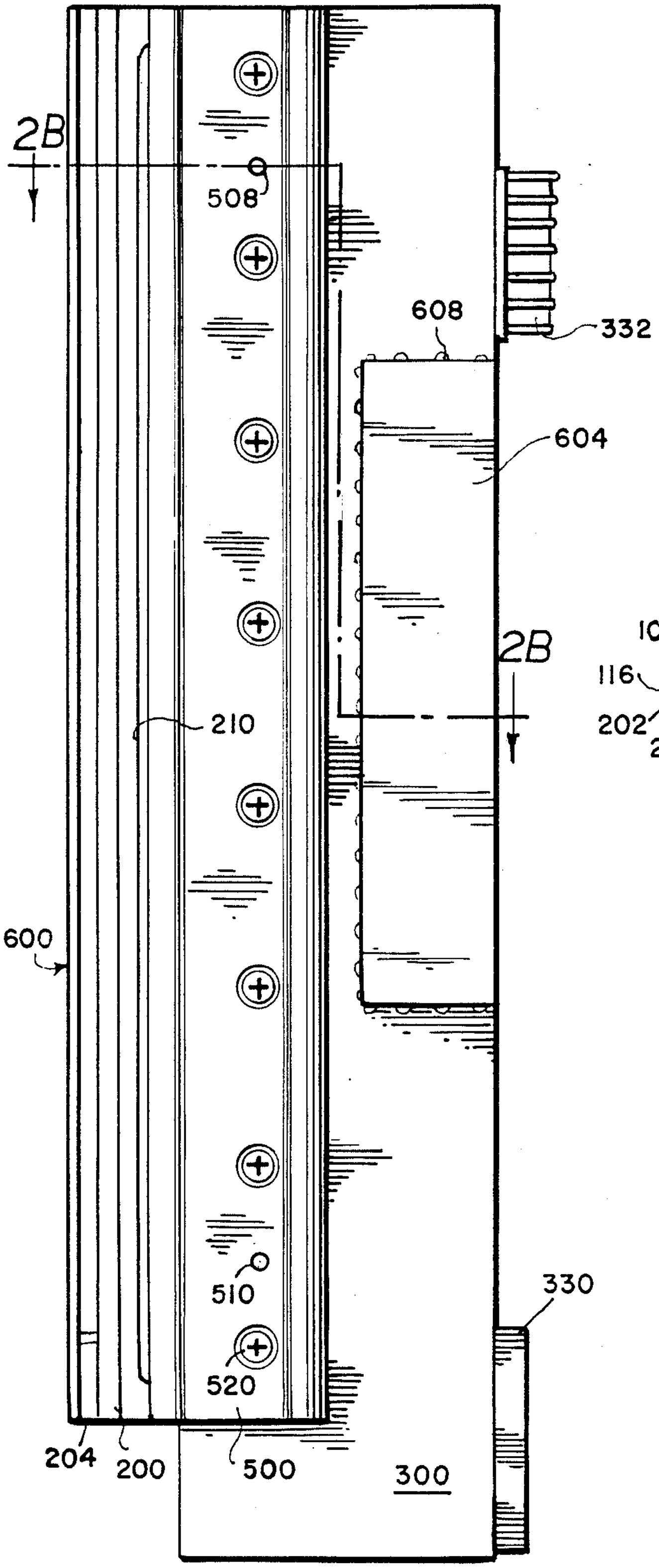
FIG. 2A
FIG. 2C
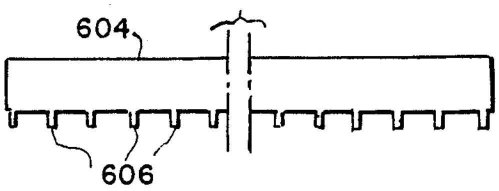
FIG. 2B
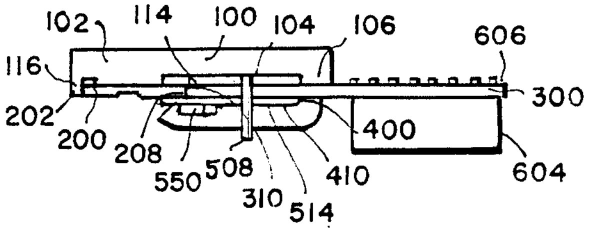
FIG. 2D
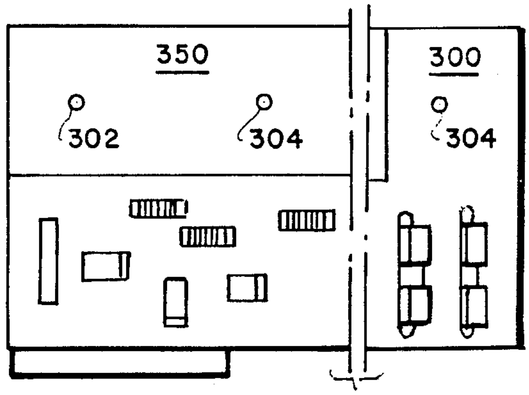
FIG. 2E
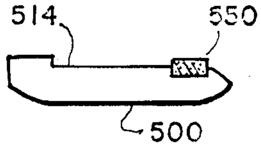

FIG. 3
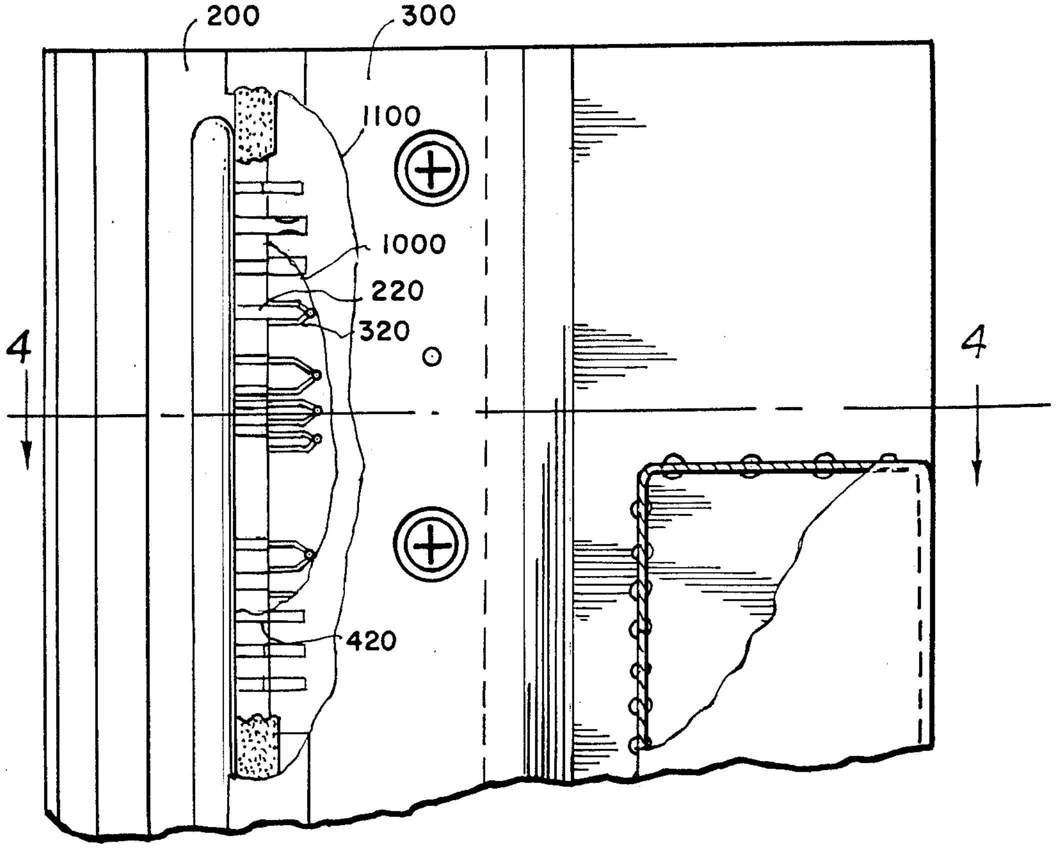
FIG. 5
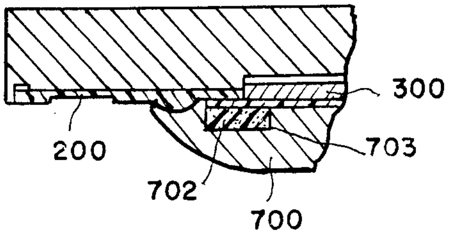
FIG. 4
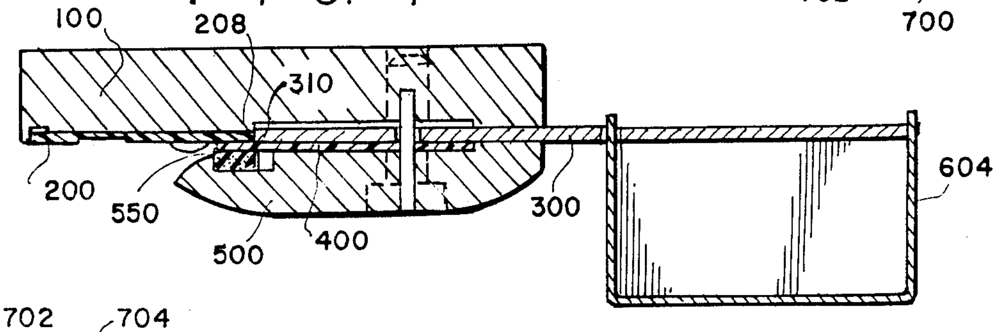
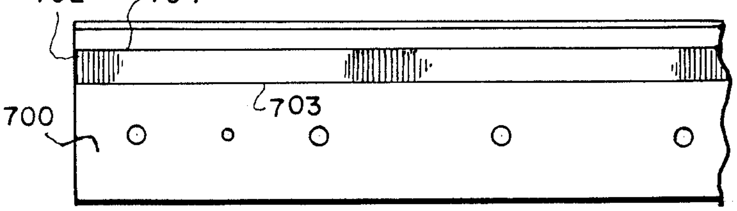
FIG. 6

SELF-ALIGNING PRINT HEAD ASSEMBLY WITH ADVANCED SHIELDING CHARACTERISTICS

FIELD OF THE INVENTION

The present invention relates to a shielded print head assembly which is formed of a plurality of interconnected elements and in which the connection between these elements is self-aligning. More specifically, the print head of the present invention includes a plurality of detachable elements which are self-aligned to one another and which can all be maintained connected to, and shielded by, a ground plane.

BACKGROUND AND SUMMARY OF THE INVENTION

Thermal print heads are extensively used in many types of image generating devices such as printers, facsimile machines and copying machines. A print head of this type has many problems which must be solved before a practical device can be obtained. One is that of interfacing to the print head, which has a large number of elements. A facsimile machine, for example, typically has a print head with an approximately 1800 elements extending in a line. As the paper travels across these elements, they are selectively turned on and off to darken corresponding areas of the paper. Hence, an interface must be made to all of the elements. Moreover, this interface must be of the shielded type, in order to minimize the emissions that radiate from the print head. If too much noise is allowed to enter the system from the radiation from the print head, the signal-to-noise ratio may become degraded to the point that an unacceptable image is produced by the facsimile machine. However, the delicacy of the print head and the necessity for many connections makes shielding of this print head relatively difficult. Moreover, the delicacy of these print heads has caused difficulty in precise alignment of its elements. Another related problem is that much interface circuitry is necessary for use with a print head. However, due to the delicacy of the assembly, it has been previously necessary in the art to locate this interface circuitry at some place relatively remote from the print head. This has associated problems, including the possibility of extra noise entering the system in the relatively long interface length between the two structures.

The present invention obviates these problems in a new way, not in any way taught or suggested by the prior art.

One attempt to obviate the above problems is exemplified by the Japanese Patent document No. 61-57357. FIG. 2 of this patent shows a three-piece thermal printing device which includes a circuit board as one element thereof. A top piece 16 and a bottom piece 9 have a circuit board 11 therebetween. A thermal head 8 is adapted to be located in contact with the circuit board. However, alignment of the structures in this patent would be a tedious manual process, which would be expected to be frequently necessary. The alignment would presumably be made by positioning the circuit board in the exact proper location and by tightening screws. However, the process of tightening the screws may itself misalign the circuit board. Moreover, it appears that this reference is restricted to the use of a circuit board/print head assembly which is one, premade integral piece. This would require the use of a specially-made part for this print head assembly. This would also require the entire print head assembly to be replaced if any component on the circuit board were to fail.

Finally, the shielding aspects of this reference are deficient. The teaching of this reference is that the circuit board should be totally located under the mounting means 16. This would require either a very large top plate or very little circuitry. Moreover, this would require low-height circuitry, and probably could not accommodate normal circuitry. In contrast, the design of the present invention enables more circuitry to be provided on the circuit board, because the circuit board can extend above the bottom plane of the top plate.

U.S. Pat. No. 4,571,598 also teaches a system with a circuit board that uses a thermal head. However, this patent adheres the circuit board to the substrate using glue or the like. This certainly does not obviate the problems associated with such assembly, however, as a tedious step in the process would include gluing the circuit board. Moreover, thermal expansion and contraction would be expected to eventually move the glued structures out of alignment, at which time an entire new circuit would FIG. 8 of U.S. Pat. No. 4,684,960 shows a thermal print head assembly including a circuit board. Once again this circuit board/print head is a single piece assembly. Similarly, none of the other prior art in any way teaches or suggests the use of the structure according to the present invention, and therefore is relatively disadvantageous as compared therewith.

The print head assembly of the present invention obviates these problems by forming a base with a registry means which aligns the structures including the circuit board and a connector thereto in self-alignment. This base also forms a ground plane used for shielding the assembly. The base includes a top plane and a front edge extending above the top plane as well as including a pair of side surfaces. The base also includes the registry means which have been previously discussed, and which are preferably formed by at least two pins, extending upwardly. A thermal print head is located on the base with its connector at one end and with its printing elements at another end. The printing elements are aligned against the front edge surface of the base which includes a lip for that purpose. This aligns the thermal print head on the base. A controlling circuit board is also aligned on the base, by forming the controlling circuit board with holes that align with the registry means. These holes are preferably plated-through holes, so that the ground plane of the circuit board becomes electrically connected to the base through these registry means passing through the plated-through holes. The circuit board also has a connector disposed adjacent the connector of the thermal print head. A connecting structure is then aligned on the registry means and connects the circuit board connector with the connector of the thermal print head. Finally, a cover is provided for holding all of the structures together, and for compressing the structure in the area of the connection between the print head and the circuit board. The cover is also connected to the ground plane to provide additional shielding.

BRIEF DESCRIPTION OF THE DRAWINGS

These and other advantages of the invention will now be described with reference to the accompanying drawings, wherein:

FIG. 2A shows this print head assembly in its assembled state;

FIG. 2B shows a cut-away view along the line 2B—2B in FIG. 2A;

FIG. 2C shows the shielding cover used according to the present invention;

FIG. 2D shows a bottom view of the circuit board 300 FIG. 1;

FIG. 2E shows a side view of the cover member 500, showing the compressible member in sectional view.

FIG. 3 shows the assembled print head in cut-away section;

FIG. 4 shows a cross-section along line 4—4 of FIG. 3;

FIG. 5 shows an alternate cut-away view along the line 4—4 of FIG. 3 according to a second embodiment of the invention; and FIG. 6 shows a bottom view of the cover piece of the second embodiment.

DESCRIPTION OF THE PREFERRED EMBODIMENTS

Figure 1:
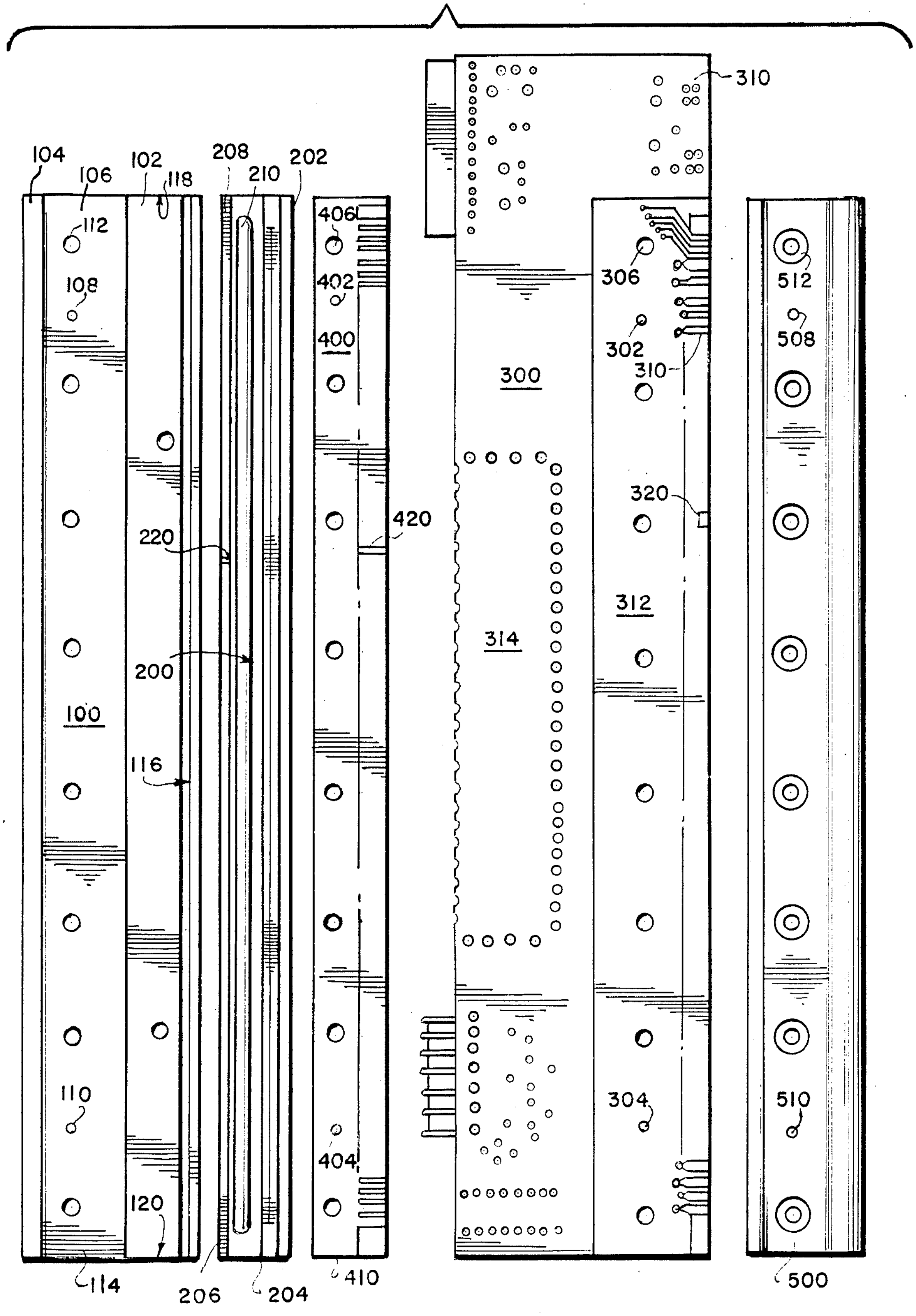
FIG. 1 shows a view of each of the various layers making up the print head assembly of the present invention.

FIG. 1 shows a view of the various separate structures which, when connected properly, form the preferred embodiment of the present invention. The structure forming the framework for the entire structure is the base, generally shown as element 100. The top surface of base 100 defines three general areas. A print head receiving area 102 and an interface receiving area 104 are of substantially the same height above a bottom surface of the base. Connection area 106 is of a slightly lower height than print head receiving area 102 and interface area 104.

Connection area 106 is used to self-align the structures forming the assembled print head assembly. Specifically, registry means 108 and 110 are provided extending above a top surface of connection area 106, and which in the preferred embodiment are formed as pins which extend above a top surface of connection area 106. A plurality of means for receiving fasteners 112 are also provided. In this embodiment, these means for receiving fasteners include threaded holes, which are adapted to receive screws. Connection area 106 is located lower than interface area 104, and is preferably covered with an insulating sheet 114. Insulating sheet 114 covers interface area 104, so that a conducting member may be placed on the interface area 104 without any danger of shorting the conducting member to the ground plane defined by base 100. The advantageous layout wherein connection area 106 is lower than the other areas enables an insulating layer to be disposed covering the ground plane without affecting the overall uniformity of height. This enables a conducting member to be easily located thereupon and to sit flat against the surfaces.

Print head receiving area 102 is formed with surfaces for maintaining the print head in a precise location. Print head edge receiving surface 116 is a lip which extends above a top surface of base 100. This lip maintains a forward edge of the print head (to the right in FIG. 1) in a precise location so that it cannot go any further forward (to the right). Edge surfaces 118 and 120 also align the print head, so that the position of print head 200 is precisely maintained by merely locating it into place and aligning it between all various surfaces.

Print head 200 is adapted to be located on print head receiving area 102 with its surface 202 against lip 116. Surface 202 is the forward end surface, and is adjacent to the side of the print head that includes print head resistors 204. The other edge surface 206 of print head 200 is adjacent to the side with connector 208 imprinted thereon. The size of print head 200 is such that connector 208 is located over connecting area 106 on insulator 114. Insulator 114 is provided to obviate any possibility of the connections between the connectors accidentally being shorted to ground. Print head 200 also includes a bump area 210.

Circuit board 300 is formed with registry holes 302 and 304 which are adapted to mate with registry means 108 and 110 respectively. Circuit board 300 also includes holes 306 through which the fastener that is adapted to mate with fastener receiving means 112 can extend. Circuit board 300 includes a connector 310 at one edge portion thereof. When assembled, circuit board connector 310 is over connector receiving area 106 on the base, and therefore adjacent connector 208 of print head assembly 200. This will be explained when referring to subsequent drawings. Shielded area 312 is preferably tinned in this embodiment, thereby forming a conductive ground plane. The conductive ground plane includes all holes such as 302, 304 and 306 being plated-through, and therefore electrically coupled to a conductive ground plane on the other side of the circuit board assembly 300 (shown in FIG. 2D). Conductive area 312 is positioned over interface area 104 and connecting area 106 on the base. This portion of the circuit board is plated with tin on both sides, thereby forming a ground plane on both the side which overlies the base, and on the other side. The remaining area 314 of circuit board assembly includes a plurality of components thereon which may be of various types.

Cut out portion 1000 in FIG. 3 shows the alignment technique between circuit board assembly 300, and print head 200. Portion 1000 in FIG. 3 shows each connector element, such as connector element 320 of circuit board 300 being adjacent another connector element such as connector element 220 of print head 200. That is, the connector elements 320 and 220 are adjacent to one another, over connection area 106 of base plate 100. It still remains, therefore, to connect the connector 208 of print head 200 with the connector 310 of circuit board 300. This connection is performed by connector piece 400 shown in FIG. 1. Connector piece 400 includes registry holes 402 and 404, through which pins 110 and 108 extend to maintain connector piece 400 in proper alignment with print head 200, circuit board 300, and base 100. Connector piece 400 also includes screw holes 406 through which the fasteners extend.

In this first embodiment, connector piece 400 is formed of an insulating material, such as nylon or epoxy, upon which a conductive material, such as copper, is selectively plated. The top surface 410 of connector piece 400 (reverse view of that shown in FIG. 1) is insulating, while the bottom surface is insulating in its nylon portions and conducting in its copper portions. The copper portions are formed at locations corresponding to the locations of connector 208 on print head 204 and connector 310 on circuit board 300 when connector piece 400 is properly positioned. Connector piece 400 serves as the interface between these two connectors by providing conductive material which connects to the print head connector 208 and also connects to the circuit board connector 310. Moreover, since connector piece 400 has an insulating surface 410, a ground shield can be located above the connector piece, while not affecting any of the connections.

Connector piece 400 also includes inner surfaces formed as holes 402 and 404 that mate with the registry means 108 and 110 thereby maintaining it in self-alignment with connectors 208 and 310. A specific connector element 420 is shown, adapted for connecting connector element 320 of circuit board 300 with connector element 220 of print head 200.

FIG. 3 shows the connection performed by connector piece 400. Cut-away portion 1100 of FIG. 3 shows connector piece 400 in registry over the interface between print head 200 and circuit board 300.

Since connector piece 400 is insulated on one side, it can be precisely and tightly mounted against the connectors underneath it. Moreover, cover piece 500, which presses against connector piece 400, can be a conductive piece and can form a ground plane.

Cover piece 500 is preferably formed of a conducting material, and has holes 508 and 510 adapted to mate with registry means 108 and 110. Corresponding hole 512 is also provided, through which the fastener(s) holding the entire assembly together can be placed. The holes 508 and 510 are not necessary, because it is not as important that the cover piece be maintained precisely in position. What is important to maintain in self-aligned relationship is print head 200, circuit board 300 and connector piece 400. As long as cover piece 500 provides pressure between these three self-aligned structures, it is sufficient—even if it is not aligned precisely in position. Therefore, while registry holes 508 and 510 are shown in FIG. 1, they are not absolutely necessary.

FIG. 2A shows the assembled print head assembly. Printing end 600 includes the print head 200 with resistor elements 204 extending beyond shielding assembly and being uncovered. This end contacts and selectively darkens portions of the facsimile paper. Connectors 320 and 310 of circuit board 300 couple signals to the print head assembly. Interface circuitry is also included on circuit board 300. By locating this interface circuitry close to the print head (on the same shielded assembly), a better degree of noise immunity is obtained while still maintaining the shielded characteristics of the print head assembly. This also allows use of standard, off-the-shelf items, and allows these items to be assembled relatively easily.

Cover piece 500 is shown with a plurality of fasteners 520 to provide assembling pressure on connector piece 400 (which is under cover piece 500 and therefore cannot be seen in FIG. 2A.) Registry holes 508 and 510 can also be seen in this diagram.

FIG. 2A also includes a shielding cover 604. This shielding cover forms a substantially covered area under which delicate circuitry is located. The shielding cover is shown in more detail in FIG. 2C, and is formed with a plurality of bottom pins 606. These bottom pins each extend through one corresponding hole 608 in the printed circuit board assembly. Each of these holes is grounded to the ground plane formed by base 100, cover 500, and the grounded portion of circuit board 300. Therefore, a very complete shield is formed within the cavity formed by shielding cover 604.

FIG. 2B is a sectional view across the line 2B—2B in FIG. 2A, and shows a cross-section of the device. Base 100 includes print head receiving section 102 and connector section 106. The indented interface section 104 is also shown, with insulator 114 being shown disposed in this indented section in sectional view. Edge 202 of print head 200 abuts against front lip 116 of the base. Connector 310 of circuit board 300 is formed in substantially the same plane as connector 208 of print head 200, and is formed so that connector 310 on circuit board 300 is exactly adjacent corresponding print head connector 208.

The layout of shielding cover 604 is also shown in FIG. 2B, along with the ends of pins 606, which extend through the circuit board to the other side in order to form a maximal connection with the ground plane to maximize the shielding effect.

Connector piece 400 is shown above and against the plane formed by connector 208 of print head 200 and connector 310 of circuit board 300. Insulating surface 410 of connector piece 400 abuts against bottom surface 514 of cover 500.

In this embodiment, the bottom surface of cover piece 500 includes a strip 550 of compressible material such as foam rubber to ensure a tight fit against connector piece 400. This portion extends below the bottom surface 514 of the cover piece 500, to ensure that the most pressure is exerted at this point. Moreover, this point is chosen to be exactly the location where the connectors of print head 200 and circuit board 300 meet one another and are covered by connector piece 400.

FIG. 2D is a bottom view of circuit board assembly 300, showing shielded area 350, with plated through registry hole 302, as well as showing the other registry hole 304. FIG. 2D also shows a representative amount of circuitry located on this bottom surface.

FIG. 2E shows a cross-sectional view of cover piece 500 of this first embodiment. This figure shows the compressible area or strip 550 extending beyond a bottom plane 514 of cover piece 500.

FIG. 3 shows a partial cut-away view of the assembled print head with two cut-away portions 1000 and 1100 showing the connections between print head 200 and circuit board 300 using connector piece 400. Cut-away view 1000 shows the connection area between connector 208 and connector 310, and cut-away 1100 shows connector piece 400 in position.

A cross-sectional view of this invention along the line 4—4 of FIG. 3 is shown in FIG. 4. This view shows connector piece 400, formed of a strip of insulating material such as nylon or epoxy, and on which one side has a plurality of conducting traces. Compressible area 550 on cover piece 500 forms an extremely tight registry between nylon connector piece 400 and print head 200/circuit board 300 below. Therefore, the flexible connector piece 400, when coupled with the cover piece 500, connects the circuit board assembly with the print head assembly in self-alignment.

A second embodiment of this invention is also possible, and a partial cross-section thereof along the line 4—4 in FIG. 3 is shown in FIG. 5. According to this second embodiment of FIG. 5, cover piece 700 is formed integrally with a generic connector 702 that connects circuit board 300 to print head 200. Generic connector 702 has a compressible piece 703 formed of a strip of foam rubber. A bottom surface of the compressible piece 703 is formed with a plurality of connecting traces 704 (as shown in FIG. 6). Since compressible piece 703 is bonded to the cover, it avoids the necessity of requiring a separate piece to perform the connecting function. Moreover, the connecting technique of the second embodiment uses a plurality of traces 704 which are evenly and finely distributed along the length of compressible piece 703 and could therefore be used to connect any circuit board to any other circuit board as long as the width of each of traces 704 is less than the distance between conducting portions of the boards. In this way, there is no danger at all of shorting out two adjacent connectors.

Therefore, the second embodiment of FIGS. 5 and 6 produces additional advantages by using a connector which will accommodate a wide number of different kinds of circuit boards.

The shielding of the present invention is greatly improved over prior print heads. First of all, both the base and the cover plate form a ground plane, these ground planes being connected to one another both through the registry means and the fasteners which hold them together. This ground plane of the base and cover plate is also connected to the ground plane of the circuit board, to which it is connected, and by the registry pins making contact with the plated-through holes on the circuit board 300. Additional shielding is provided by the shield cover 604, also connected to this common ground. Finally, by providing the different components connected to one another in this way, it becomes possible to maintain the circuit board in proper registry with the other structures, while also maintaining a large enough circuit board that a large amount of circuitry can be located thereon.

Although only a few embodiments have been described above, those of ordinary skill in the art will certainly understand that many modifications are possible in the preferred embodiment without materially departing from the teachings thereof. For instance, although the print head described is intended for use with a facsimile machine, it could be employed with any other equipment in which a thermal print head is required. Similarly, other methods of connecting together the various parts, once self-aligned, could certainly be envisioned by those of ordinary skill in the art.

All such modifications are intended to be encompassed within the following claims.

What is claimed is:

1. A self-aligning print head assembly carrying a thermal print head with a connector having a plurality of connector elements thereon, comprising:

a base, having:

(a) means for aligning said thermal print head at a precise position thereon; and (b) at least two registry means, each comprising an element extending above a top plane formed by a top surface of said base;

input/output circuitry means, having a connector with a plurality of connector elements on one side and formed with inner surfaces that mate with said registry means to hold said input/output means in self-alignment on said base, with said connector of said input/output means aligned adjacent the connector of said thermal print head; and cover and interface means, tightly connected against both of said print head connector and said input/output means connector, including:

(a) interface means, aligned using said registry means, for connecting at least one connector element of said print head to at least one corresponding connector element of said input/output means; and (b) cover means, insulated from said interface means, for tightly holding said interface means against said connector of said input/output circuitry means and of said print head.

2. An assembly as in claim 1 wherein said base forms a ground plane, and said cover means is electrically connected to said base.

3. An assembly as in claim 2 wherein said input/output circuitry means includes a circuit board, having at least one ground plane, electrically coupled to said ground plane formed by said base and said cover means.

4. An assembly as in claim 1 wherein said input/output circuitry means is a circuit board, and said circuit board extends beyond a perimeter formed by both of said base and said cover and interface means.

5. An assembly as in claim 1 wherein said interface means includes a sheet of insulating material, separable from said cover means, and one side of which is imprinted with a conductive pattern contacting both said connector element of said print head and said connector element of said input/output means.

6. An assembly as in claim 5 wherein said insulating material is formed with inner surfaces that define means for mating with said registry means of said base.

7. An assembly as in claim 1 wherein said interface means is connected to said cover means, and is formed by a plurality of conductive traces, insulated from said cover means.

8. An assembly as in claim 1 further comprising a compressible member coupled to a bottom surface of said cover means at a location of interface between said print head connector and said input/output means connector.

9. A self-aligning print head assembly for carrying a print head, comprising:

a base, having:

(a) a top plane surface, (b) a front edge surface extending above said top plane surface, and forming a lip, (c) a pair of side surfaces, and (d) at least two registry means, each comprising an element extending above said top plane surface of said base;

a print head, having a connector at one end and printing elements at another end, disposed with end surfaces at said another end against said front edge surface of said base;

a controlling circuit board, having a connector at one end, and formed with inner surfaces that mate with said registry means, so that said one end and said connector of said circuit board are disposed adjacent said connector of said print head; and cover means for connecting said connectors of said print head and said controlling circuit board with one another, said cover means including inner surfaces that mate with said registry means to maintain a position of said connectors in selfalignment.

10. An assembly as in claim 9 wherein said base forms a ground plane.

11. An assembly as in claim 9 wherein each said registry means is a pin coupled to said base, and extending above said top plane surface thereof.

12. An assembly as in claim 9 wherein said base is also formed with means for receiving fasteners.

13. An assembly as in claim 12 wherein said means for receiving fasteners include threaded screw holes formed in said base.

14. An assembly as in claim 9 wherein a length of said print head is chosen to be coincident with a length of said base, so that end surfaces of said print head align against said side surfaces of said base.

15. An assembly as in claim 9 wherein said cover means includes an insulating sheet which is removable therefrom, and which has one side thereof that is imprinted with a conducting pattern, and is formed with said inner surfaces that mate with said registry means on said base.

16. An assembly as in claim 15 wherein said base includes a print head receiving area adapted to underlie said print head, and a connector receiving area adapted to underlie said controlling circuit board, said print head receiving and connector receiving areas forming said top plane surface, and an interface area between said connector area and said print head receiving area, and lower in height than said top plane surface, adapted to underlie at least one of said connectors.

17. An assembly as in claim 16 wherein said cover means is formed with a compressible member extending beyond a lower surface thereof, at a location where said connector of said print head and said connector of said controlling circuit board interface with one another, and over said interface area on said controlling circuit board.

18. An assembly as in claim 17, further comprising an insulating sheet, located only on said interface area.

19. An assembly as in claim 9 wherein said base and said cover means are formed of conductive materials, and are electrically connected to one another, and wherein said controlling circuit board includes a ground plane also connected to said cover means and said base.

20. An assembly as in claim 9 wherein said cover means includes a plurality of traces insulatedly coupled to a bottom surface of said cover means, said traces each being insulated from one another, and separated from each adjacent trace by an amount less than a smallest separation between elements of said connector of said controlling circuit board, and of said connector of said print head.

21. An assembly as in claim 20 further comprising a compressible member, coupled as an insulation between said traces and said bottom surface of said cover means.

22. An shielded print head assembly, comprising:

- a base formed of a conductive material defining a ground plane;
- a print head, aligned on said base and having a connector at one end and printing elements at another end;
- a circuit board aligned with said base, having a connector at one end adjacent with said connector of said print head, and having a ground plane that is electrically connected to said ground plane of said base;
- connecting means, aligned with said base, for connecting said circuit board connector to said print head connector, said connecting means including an insulating surface; and
- cover means, formed of a conductive material, and electrically connected with said ground planes of said base and said circuit board, and disposed against said insulating surface of said connecting means, for tightly holding said print head, said circuit board and said connecting means against one another.

23. An assembly as in claim 22 comprising a plurality of registry means, coupled to said base and extending above a top surface of said base, each said registry means comprising an element defining an electrically conductive surface connected to said ground plane of said base, said circuit board aligned on said registry means, and said ground plane of said circuit board electrically connected with said registry means, and said connecting means aligned using said registry means.

24. An assembly as in claim 23 wherein said circuit board includes a shielded box coupled to said ground plane thereof, and within which a plurality of circuitry is adapted to be disposed.

25. A self-aligning print head assembly for carrying a thermal print head, comprising:

- a base, formed of a conductive material to form a ground plane and having:
  - (a) a top plane,
  - (b) a front edge surface extending above said top plane,
  - (c) a pair of side surfaces,
  - (d) at least two registry means, each comprising an electrically conductive element, electrically connected to said base, defining a surface extending above said top plane of said base, and
  - (e) at least two means for receiving fasteners;
- a thermal print head, having a connector at one end and printing elements at another end, disposed with end surfaces at said another end against said front edge surface, and with side surfaces against said side surfaces of said base;
- a controlling circuit board, having a connector at one end, and formed with inner surfaces that mate with said registry means, disposed mated with said registry means so that said one end and said connector is disposed adjacent said connector of said print head, said circuit board having a ground plane which is connected to said ground plane of said base;
- connecting means, aligned with said base, for connecting said circuit board connector to said print head connector, said connecting means including an insulating surface and including inner surfaces that mate with said registry means to maintain its position and connection in self-alignment; and
- cover means, electrically connected with said ground planes of said base and said circuit board, and disposed against said insulating surface of said connecting means, for tightly holding said print head, said circuit board and said connecting means against one another.

26. An assembly as in claim 25 wherein said base includes a print head receiving area adapted to underlie said print head, a connector receiving area adapted to underlie said controlling circuit board, said print head receiving and connector receiving areas forming said top plane surface, and an interface area between said connector area and said print head receiving area, and lower in height than said top plane surface, adapted to underlie at least one of said connectors.

27. An assembly as in claim 26 wherein said cover means is formed with a compressible member extending beyond a lower surface thereof, at a location where said connector of said thermal print head and said connector of said controlling circuit board interface with one another, and over said interface area on said circuit board.

* * * * *